INVENTORS
Heinrich Zink
Erich John
Paul Büttner
BY
Mason, Ross & Mestern

United States Patent Office 3,188,888
Patented June 15, 1965

3,188,888
EPICYCLIC TRANSMISSION
Heinrich Zink, Goggingen, and Erich John and Paul
Büttner, Augsburg, Germany, assignors to Zahnräderfabrik Renk Aktiengesellschaft, Augsburg, Germany, a corporation of Germany
Filed Mar. 18, 1963, Ser. No. 265,950
Claims priority, application Germany, Jan. 31, 1958, Z 6,484
10 Claims. (Cl. 74—801)

Our present invention relates to a torque-transmitting system of the epicyclic-gear type in which a sun gear is coaxially surrounded by a ring gear and one or more planetary gears are disposed in an annular clearance between them. This application is a continuation-in-part of our prior application Ser. No. 738,691 filed May 29, 1958, now Patent No. 3,090,258, issued May 21, 1963.

It is known to provide the gears of such transmissions with so-called herringbone teeth, i.e. with two sets of helical teeth of opposite pitch, which serve to center the co-operating gears relatively to one another by virtue of the opposite axial thrusts developed at the complementary toothed portions in mesh with each other. As pointed out in our prior application, however, unavoidable manufacturing irregularities tend to give rise to a variety of stresses which, especially in high-speed transmissions, should be relieved by a certain degree of relative mobility of the gears in axial, peripheral and, in some instances, also radial direction. Prior systems satisfied this requirement only imperfectly, the object of our present invention being therefore to provide an improved transmission of this type in which maximum relative adjustability is assured and positive guidance of the rotating elements is reduced to the minimum necessary to maintain an operative structure.

In accordance with an important feature of this invention we provide supports for the sun, planetary and ring gears which are so mounted and constructed that only one of the gears is positively held against axial displacement, the remaining gears being shiftable along the common axis of rotation in response to stresses caused by irregularities of tooth design. Naturally, as is well known, one of the supports must also prevent any major angular displacement of the associated gear or gears, the two other supports being respectively connected to a drive shaft and a driven shaft. In many cases it will be most convenient to restrain the ring gear against rotation, yet we prefer that even such restraint should not be rigid but should be effected by a resilient force provided, advantageously, by nests of cylindrical springs interposed between the ring-gear support and the transmission housing.

Another feature of this invention creates increased flexibility of design and relative adjustability of the parts by an axial subdivision of each planetary gear into two sections each bearing a pair of axially spaced sets of helical teeth of opposite pitch and like diameter for the purpose noted above. In this construction the teeth of one planetary-gear section mesh with those of the sun gear whereas those of the other section mesh with the teeth of the ring gear, thereby providing in effect a two-stage transmission. It is especially advantageous to make the two sections on only one planetary gear rigid with each other and to mount the two sections of each remaining planetary gear in such fashion that they are at least limitedly axially displaceable with respect to each other.

Where, as is usual, two or more planetary gears are provided, only one of them need be held against axial displacement if both the sun gear and the ring gear are to be axially shiftable. In such instances, as also in cases where the sun gear is axially fixed, the ring gear may be laterally flanked by spring-loaded rings resiliently opposing, but not preventing, its axial shifting.

If the sun gear is to be floatingly disposed, i.e. without positive axial guidance, it can be operatively coupled—pursuant to a further feature of our invention—with its associated shaft via a preferably tubular connector whose ends are provided with teeth meshing with complementary teeth respectively provided on the sun-gear support and on a suitable shaft extension coaxial therewith. This connector, which is unsupported except for the two sets of teeth referred to, will allow the sun-gear support not only to shift axially but also, if necessary, to wobble slightly if this is necessary to compensate for uneven tooth formations.

It should be noted that our present invention is fully compatible with certain features claimed in our above-identified patent, such as the splitting of the sun gear into two halves interconnected by a resilient joint in the form of torsionable shafts for slight relative rotation, and/or the subdivision of the planet gears into two halves mounted for limited relative axial displacement.

The invention will be described in greater detail with reference to the accompanying drawing in which.

Identical or similar elements of the various embodiments have been designated by the same reference numerals.

Figure 1:
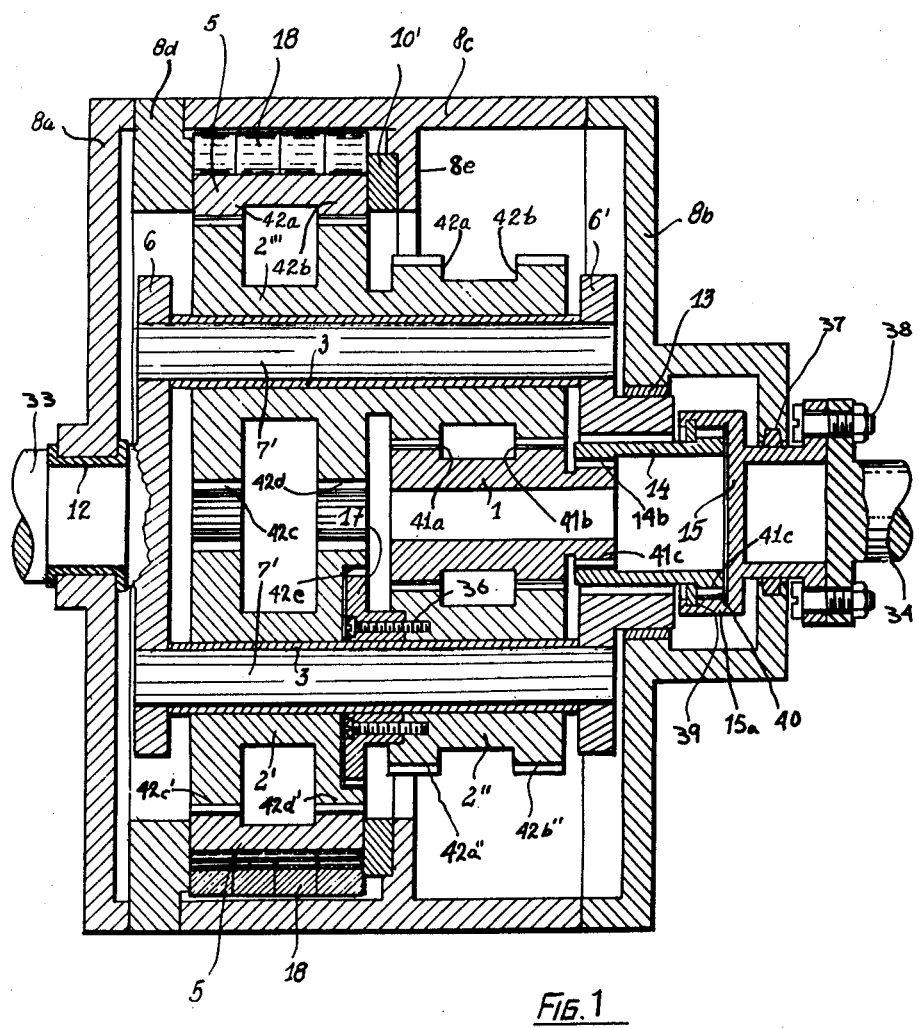
FIG. 1 shows in longitudinal section an embodiment of our invention.

The transmission shown in FIG. 1 comprises a two-stage epicyclic gear train including a sun gear supported by a central body 1, a plurality of planetary gears 2', 2" and 2''', and a ring gear on an annular body 5. These gears are disposed inside a housing constituted by a pair of end walls 8a, 8b and a cylindrical wall 8c, the end walls being centrally apertured in line with a pair of coaxial shafts 33, 34 of which one may be considered as driven from a suitable source of power (not shown) whereas the other is connected to a load. The sun gear on central member 1 is constituted by a pair of toothed portions 41a, 41b in the form of slightly raised annular ridges of like diameter, whose helical teeth are of opposite pitch to form a herringbone-type structure. Planetary gear 2''' is provided in its right-hand half with complementary toothed portions 42a, 42b respectively meshing meshing with portions 41a, 41b of the sun gear. The left-hand half of gear 2''' has similar toothed portions 42c, 42d, of larger diameter than portions 42a and 42b, which mesh with toothed portions 45a, 45b of the ring gear. The latter is held against axial shifting by an internal shoulder 8d of the housing and by a ring 10' resting against an inner housing flange 8e. The ring-gear support 5 is also held against major angular displacement by a set of peripherally spaced spring nests 18 which are lodged partly in the ring-gear support and partly in housing wall 8c as will be more fully described hereinafter with reference to FIGS. 2 and 3.

A second planetary gear is constituted by the two sections 2' and 2" respectively bearing toothed portions 42c', 42d' and 42a", 42b". Gear 2', 2" is representative of any convenient number of such planetary gears that may be provided in addition to the one-piece gear 2''', a total number of three planetary gears being convenient (cf. FIG. 3). Teeth 42a" and 42b" mesh with teeth 41a and 41b of the sun gear, in the same manner as do teeth 42a and 42b, whereas teeth 42c' and 42d' engage the teeth 45a and 45b of the ring gear, as do teeth 42c and 42d.

The planetary gears are journaled, through the intermediary of bushings 3, on bearing pins or rods 7' which span a pair of disks 6, 6' on opposite sides of these planetary gears so as to form a rotatable cage therewith. The spacing of disks 6 and 6' is sufficient to allow for some axial shifting of the planetary gears. Gear sections 2' and 2" are, furthermore, axially movable relatively to each other within certain limits established by the meshing of their herringbone teeth 42a", 42b" and 42c', 42d' with the sun-gear teeth 41a, 41b and ring-gear teeth 45a, 45b which in turn are in mesh with the two pairs of toothed portions 42a, 42b and 42c, 42d of the continuous planetary gear 2'''. Sections 2' and 2" are, moreover, interconnected for joint rotation by splined member 17 which is secured to gear section 2" by bolts 36 and is interleaved with internal teeth 42e of gear section 2'.

It will be apparent that, by virtue of the arrangement described, all the gears shown in FIG. 1 are held in approximately a predetermined relative axial position by virtue of their interengaging herringbone teeth, the axial position of the entire assembly being determined by the lateral abutments 8d and 10' between which the ring-gear support 5 is axially guided. The transmission of torque to or from shaft 33 takes place through disk 6 which is here integral with that shaft, the latter being journaled in housing wall 8a through the intermediary of a bearing diagrammatically indicated at 12. Another bearing, shown diagrammatically at 37, rotatably supports a fitting 15 which is attached to shaft 34 by means of bolts 38. Fitting 15 has an annular flange 15a with internal teeth which mesh with mating teeth 14a on a connecting sleeve 14, the latter being provided on its opposite end with teeth 14b meshing with similar teeth on an extremity 41c of sun-gear support 1. Two snap rings 39, 40 are lodged in grooves of connector 14 and coupling member 15, respectively, to maintain axial alignment between the toothed portions 14a and 15a. A bearing for disk 6' within end wall 8b has been indicated at 13.

It will be noted that the coupling provided by members 14 and 15, while insuring positive transmission of torque from central body 1 to shaft 34 or vice versa, leaves this central body and, therefore, the sun gear 41a, 41b supported only by the adjoining planetary-gear teeth 42a, 42b and 42a", 42b" so that the sun gear may shift axially, with reference to the housing and the other gears, as well as in radial direction to compensate for any irregularities of the gear teeth. If necessary, the sun-gear support 1 may also execute wobbling motions which will slightly disalign it with the axis of shafts 33 and 34.

Since the toothed portions 42c, 42d and 42c', 42d' of the planetary gears are of larger diameter than the toothed portions 42a, 42b and 42a", 42b" thereof, the system shown in FIG. 1 will operate with an increased or reduced transmission ratio, depending on whether power is applied to shaft 34 or 33, in comparison with single-stage epicyclic gear trains.

Figure 2:
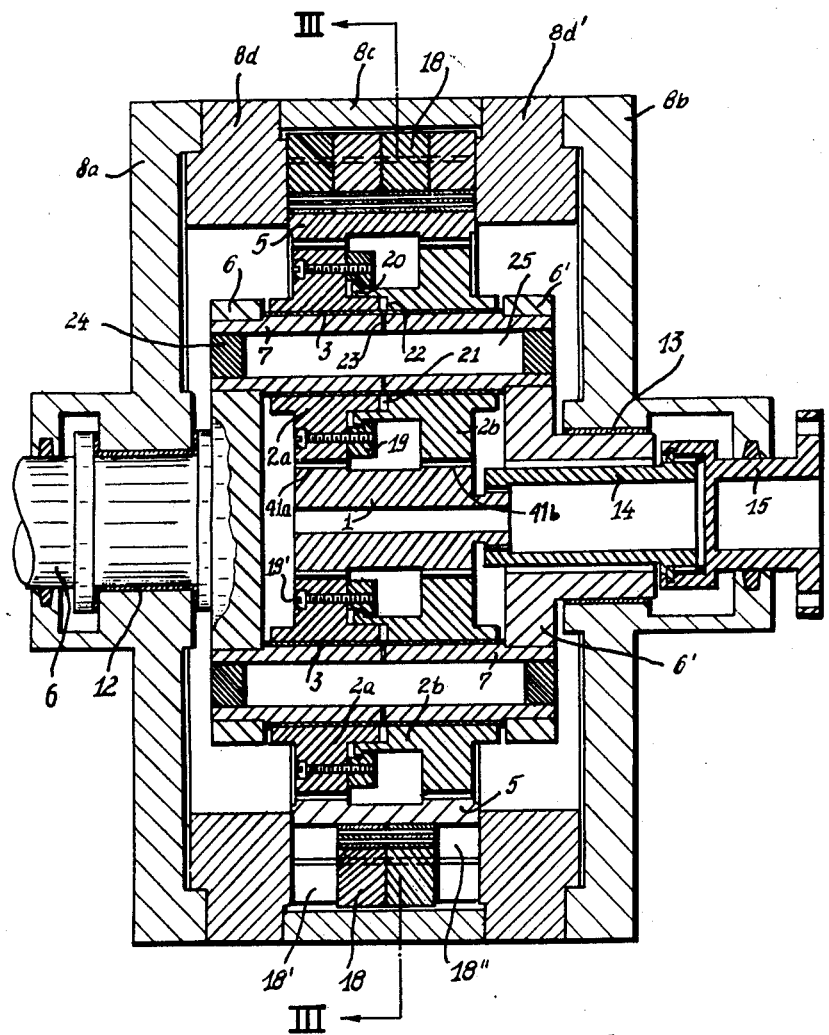
FIG. 2 is a view similar to FIG. 1, illustrating a modification.

The system of FIG. 2 differs from the preceding embodiment mainly by the fact that the epicyclic gear train has only one stage, owing to the provision of but a single pair of toothed portions 2a, 2b on each planetary gear. Each planetary-gear half 2b is formed with an annular shoulder 20 interlockingly engaging a collar 19 which is secured by bolts 19' to the gear half 2a. This interengagement of collar 19 and shoulder 20 affords a certain play for the limited relative axial displacement of the two gear halves and also provides an annular clearance 21 into which lubricating oil from the interior 25 of the associated journal rod 7 may penetrate under centrifugal force, bushing 3 and rod 7 being provided for this purpose with registering perforations 22, 23 opening into the space 21. The ends of each rod 7 are sealed by plugs 24 to prevent loss of oil. It will be understood that, when the cage 6, 6', 7 is in motion, the centrifugal force acting upon the lubricant will tend to drive the gear halves 2a, 2b apart, to the extent permitted by formations 19 and 20, but that the fluid pressure within space 21 will be overcome by whatever axial stresses due to teeth irregularities may urge the gear halves closer together.

Figure 3:
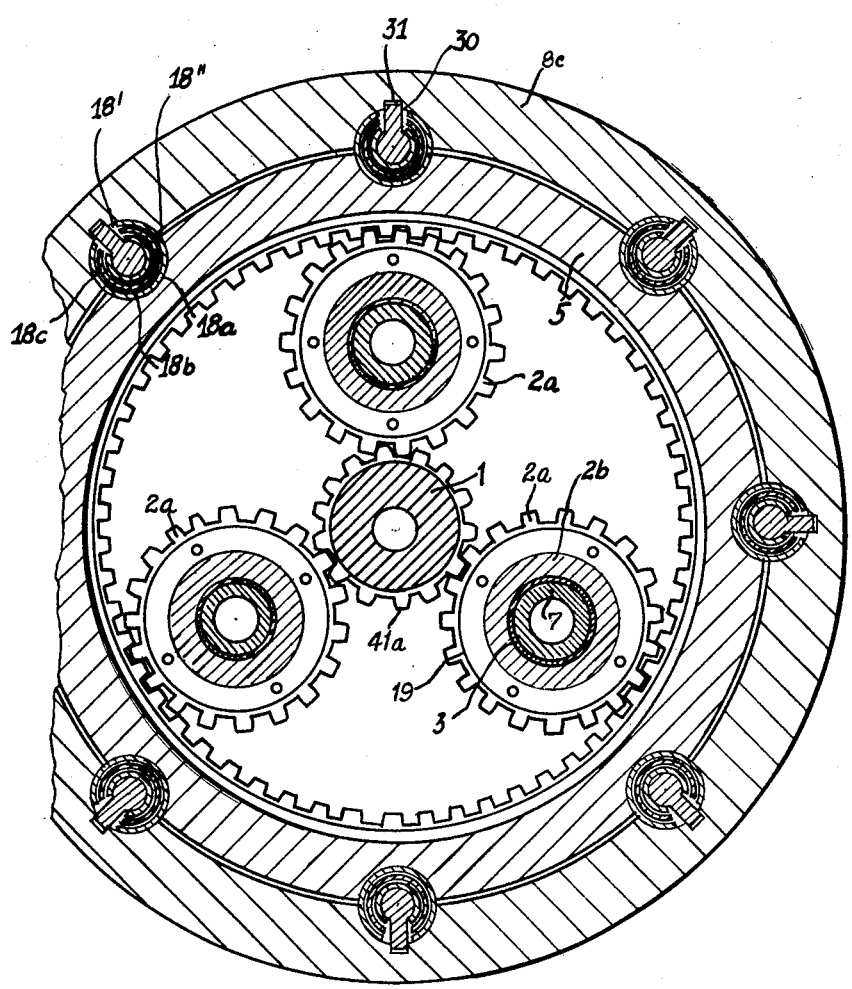
FIG. 3 is a cross-sectional view taken on line III—III of FIG. 2.

The ring-gear support 5 of the system of FIG. 2 is axially guided by being bracketed between housing portions 8d and 8d' forming annular shoulders in contact with it. FIGS. 2 and 3 also show the ring 5 and the housing wall 8c provided with complementary semi-cylindrical recesses 18', 18" which accommodate the spring nests 18. These spring nests are shown to be axially juxtaposed in groups of four (two of them having been omitted in the lower part of FIG. 2 for the sake of clarity) and composed of a plurality of generally cylindrical springs 18a, 18b, 18c disposed around retaining pins that are common to each group of four and have ribs received in axial grooves 31 of recesses 18', the pins 30 acting as cores to protect the surrounding springs against breakage. For optimum stress distribution we prefer to have the wall thickness of the nested springs diminish with increasing diameters, the outer spring 18a being the thinnest and the inner spring 18c being the heaviest of the nest.

Figure 4:
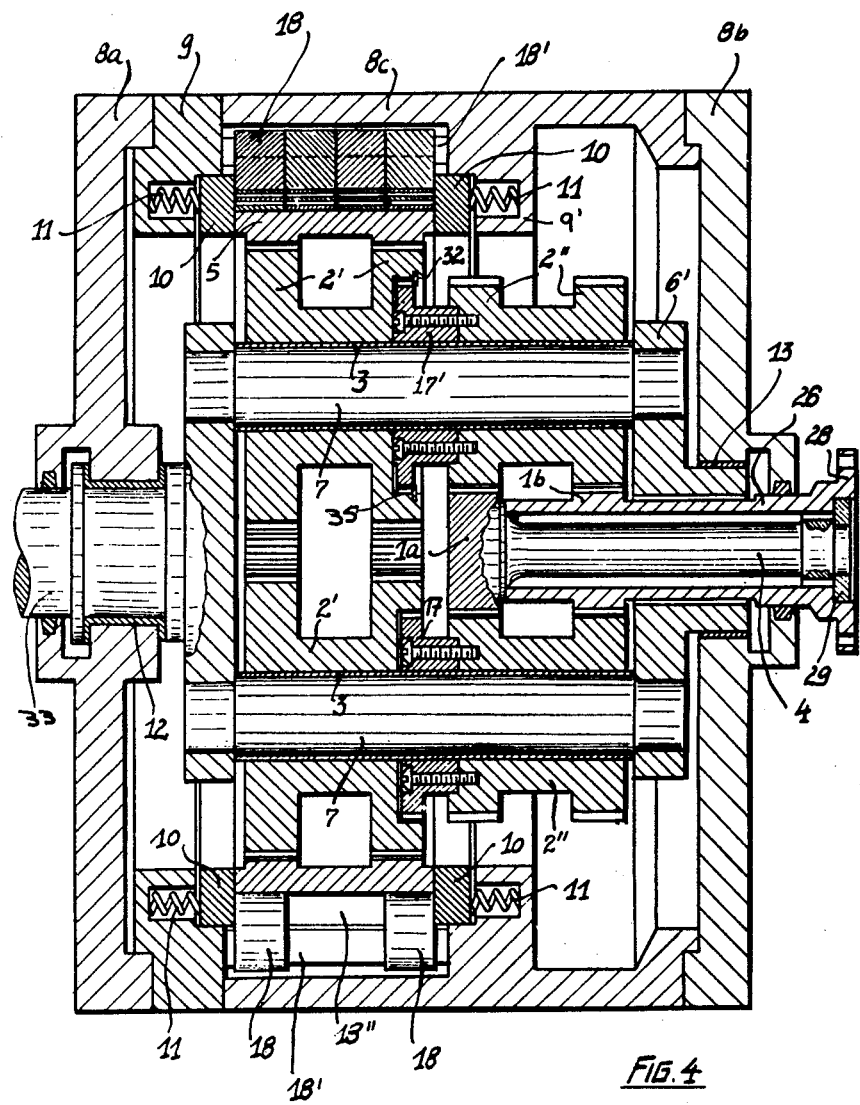
FIGS. 4 and 5 are two further longitudinal sections, similar to FIGS. 1 and 2, relating to additional embodiments.

FIG. 4 shows a system wherein, in contradistinction to the embodiments previously described, the ring-gear support is axially shiftable whereas the sun gear is held against such displacement. The sun gear consists in this case of two toothed portions 1a and 1b respectively supported on an extremity of a tubular shaft 26 and an extremity of inner shaft 4 coaxial with the former, the two shafts 4, 26 constituting a torsional joint enabling slight relative rotation of sun-gear portions 1a and 1b. Shafts 4 and 26 are interconnected for joint relative rotation at their ends remote from the sun gears 1a, 1b, the outer shaft 26 being furthermore provided with a flange 28 by which it may be joined to a shaft 34 (FIG. 1) so as to be axially fixed with reference to the transmission housing. At 29 we have shown a ring rigid with shaft 4 (e.g. press fitted thereon or welded to it) which bears upon the end of shaft 26 to keep the two shafts axially aligned.

The planetary gears of the system of FIG. 4 are similar to those of the two-stage transmission shown in FIG. 1, except that the solid gear 2''' of the first embodiment has been replaced by two gear sections 2', 2" which are relatively immobilized by a coupling gear 17' and locking rings 32, 35 bracketing the teeth of the latter.

A pair of rings 10, each under axial pressure from a plurality of coil springs 11, bear laterally upon the ring-gear support 5 so as to resist its axial displacement due to structural irregularities. The springs 11 are accommodated by recesses in an annular member 9, interposed between members 8a and 8c as part of the transmission housing, and an inner flange 9' on housing wall 8c. The operation of the system shown in FIG. 4 will be understood from the preceding description.

Figure 5:
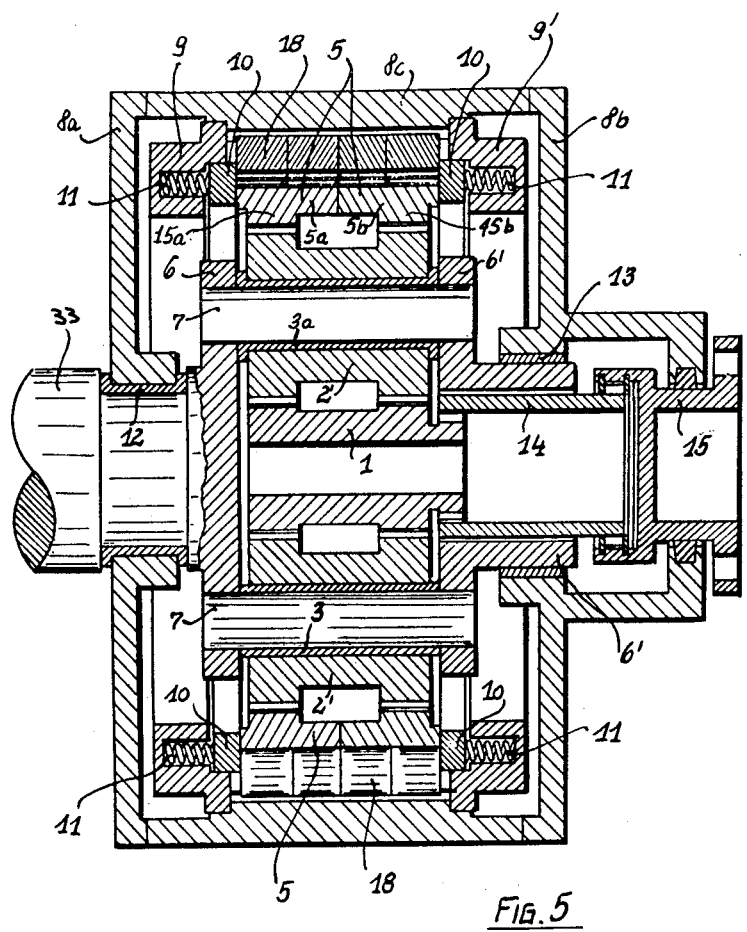

In FIG. 5 we have shown a system generally similar to that of FIG. 2, except for the fact that the ring-gear support 5 is now axially shiftable against spring-pressed abutments 10 in the manner described in connection with FIG. 4. In order to define the overall axial position of the epicyclical gear train, one of the planetary gears 2' is mounted on its journal pin 7 through the intermediary of a bushing 3a having end flanges which act as spacers occupying the axial clearances between this gear and the disks 6 and 6'. In this embodiment, we have also shown the ring-gear support 5 split into two halves 5a, 5b respectively bearing the toothed portions 45a, 45b. This division of the ring gear and its support not only simplifies the assembly but also affords an additional degree of freedom to the system in that it permits a limited axial separation of the ring-gear halves in response to stresses.

Modifications of the arrangement described and illustrated, including combinations of compatible features from different embodiments with one another and/or with features disclosed in our aforementioned patent, are possible without departing from the spirit and scope of the invention as defined in the appended claims.

We claim:
1. A system for the transmission of torque from a drive shaft to a driven shaft, comprising an epicyclic gear train including a sun gear, a ring gear coaxially surrounding said sun gear with annular clearance and a plurality of peripherally spaced planetary gears in said annular clearance meshing with said ring and sun gears, each of said gears being axially subdivided into at least one pair of rotatively interconnected helically toothed portions of opposite pitch and equal diameter respectively engaging corresponding portions of each gear in mesh therewith; first, second and third support means for said sun, planet and ring gears, respectively; a housing for said gears; retaining means on said housing holding one of said support means against major angular displacement, the other two support means being freely rotatable in said housing about a common axis; coupling means operatively connecting said other two support means with said drive and driven shafts, respectively; and means on one of said support means positively holding one of said gears against axial displacement, the remaining gears being axially shiftable within the limits set by the interengagement of said toothed portions in a manner compensating for irregularities of the latter, said housing being provided with resilient annular abutments alongside said support means yieldably opposing axial displacement of said ring gear.

2. A system as defined in claim 1 wherein each planetary gear is provided with two pairs of said toothed portions of opposite pitch, said pairs being axially separated and being respectively in mesh with said sun gear and said ring gear.

3. A system as defined in claim 2 wherein one of said planetary gears is divided into two sections each carrying one of said pairs of toothed portions, said sections being provided with connecting means insuring their joint rotation while enabling their relative axial displacement.

4. A system as defined in claim 1 wherein said second support means comprises a pair of disks bracketing said planetary gears with axial clearance, and a set of rods spanning said disks, each of said planetary gears being journaled on one of said rods.

5. A system as defined in claim 4 wherein said means on one of said support means includes spacer means between said disks and one of said planetary gears for preventing axial displacement of the latter on its rod.

6. A system as defined in claim 1 wherein said ring gear is split into two separate halves each bearing one of the toothed portions thereof, said halves being axially separable within the limits of displaceability of said annular abutments.

7. A system as defined in claim 1 wherein said retaining means comprises a plurality of nests of cylindrical springs disposed at peripherally spaced locations about said ring gear, said third support means and said housing being provided with complementary recesses receiving said spring nests.

8. A system as defined in claim 7 wherein the springs of each spring nest are of progressively decreasing wall thickness with increasing diameters.

9. A system for the transmission of torque from a drive shaft to a driven shaft, comprising an epicyclic gear train including a sun gear, a ring gear coaxially surrounding said sun gear with annular clearance, and a planetary gear in said annular clearance meshing with said ring and sun gears, said sun and ring gears being each axially subdivided into a pair of rotatively interconnected helically toothed portions of opposite pitch and equal diameter, said planetary gear being axially subdivided into two pairs of axially spaced toothed portions of opposite pitch respectively meshing with complementary portions of said sun and ring gears; first, second and third support means for said sun, planet and ring gears, respectively; a housing for said gears; retaining means on said housing holding one of said support means against major angular displacement, the other two support means being freely rotatable in said housing about a common axis; coupling means operatively connecting said other two support means with said drive and driven shafts, respectively; and means on one of said support means positively holding one of said gears against axial displacement, the remaining gears being axially shiftable within the limits set by the interengagement of said toothed portions in a manner compensating for irregularities of the latter, said housing being provided with resilient annular abutments alongside said support means yieldably opposing axial displacement of said ring gear.

10. A system as defined in claim 9 wherein the pair of toothed portions of said planetary gear in mesh with said ring gear has a larger diameter than the pair of toothed portions in mesh with said sun gear.

References Cited by the Examiner

UNITED STATES PATENTS

| | | | |
|---|---|---|---|
| 1,968,604 | 7/34 | Hertz et al. | 74—410 |
| 2,066,223 | 12/36 | Pielstick | 74—410 X |
| 2,496,857 | 2/50 | Cronstedt et al. | 74—410 X |
| 2,591,734 | 4/52 | Smith et al. | 74—411 X |
| 2,591,743 | 4/52 | Thompson | 74—411 X |
| 2,703,021 | 3/55 | Stoeckicht | 74—801 X |
| 2,737,064 | 3/56 | Stoeckicht | 74—801 X |
| 2,844,052 | 7/58 | Stoeckicht | 74—411 X |
| 3,090,258 | 5/63 | Zink et al. | 74—801 |

FOREIGN PATENTS 682,275  10/39  Germany.

DON A. WAITE, *Primary Examiner.*